(12) United States Patent
Priem

(10) Patent No.: US 6,474,167 B1
(45) Date of Patent: Nov. 5, 2002

(54) MECHANICAL AMPLIFIER

(75) Inventor: David A. Priem, Calabasas, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/537,026

(22) Filed: Mar. 28, 2000

(51) Int. Cl.[7] .............................. G01M 7/00; B06B 3/00
(52) U.S. Cl. ............................................. 73/663; 73/666
(58) Field of Search ........................... 73/662, 663, 665, 73/666, 667, 668

(56) References Cited

U.S. PATENT DOCUMENTS

| | | | | |
|---|---|---|---|---|
| 3,945,246 A | * | 3/1976 | Wadensten | 73/666 |
| 4,428,238 A | * | 1/1984 | Tauscher | 73/663 |
| 5,083,463 A | * | 1/1992 | Marshall et al. | 73/663 |
| 5,517,857 A | * | 5/1996 | Hobbs | 73/663 |
| 5,594,177 A | * | 1/1997 | Hanse | 73/663 |
| 5,969,256 A | * | 10/1999 | Hobbs | 73/662 |

* cited by examiner

Primary Examiner—Helen Kwok
(74) Attorney, Agent, or Firm—Harness, Dickey & Pierce, P.L.C.

(57) ABSTRACT

A shaker system (10) that employs a mechanical amplifier (40) for increasing the shaking capacity of the shaker (14). The mechanical amplifier (40) includes a spring (54) positioned within a support column (42) where the spring (54) is attached to an interface ring (24) supporting the load (26) to be tested at one end and the ground at an opposite end. The spring (54) can take on different configurations, and in one embodiment is a sinusoidal spring (54) having half-circle sections (60) of a predetermined radius to satisfy the resonant frequency requirements for a particular load. The resonant frequency of the spring (54) causes the shaking to be amplified, meeting the testing requirements.

11 Claims, 3 Drawing Sheets

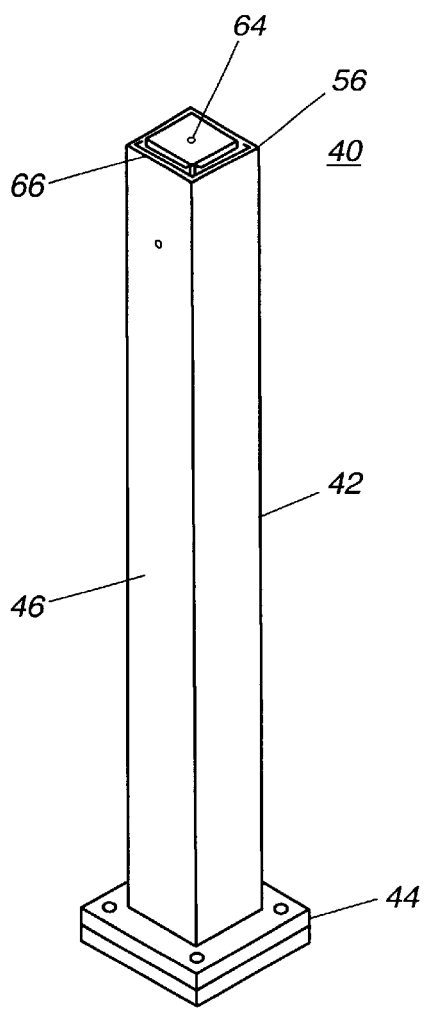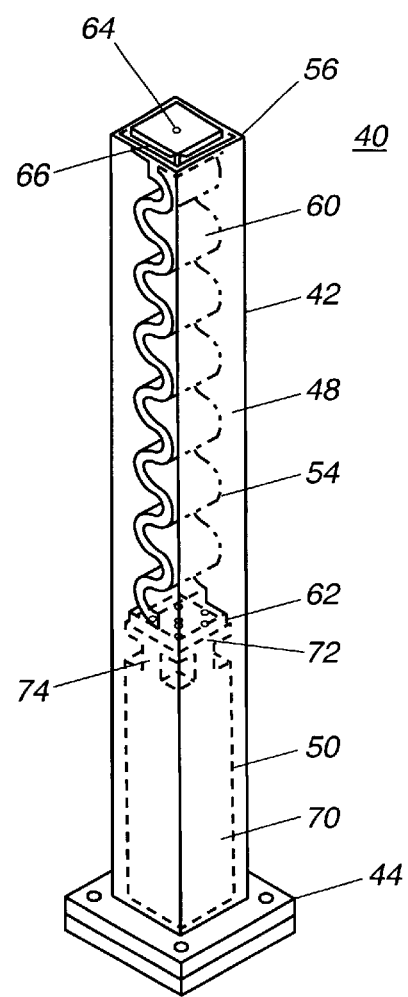
Fig. 2
Fig. 3

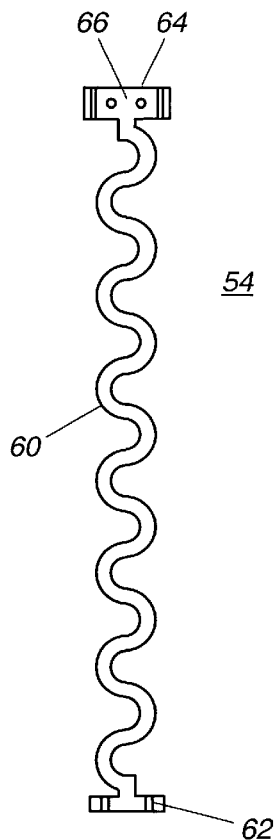
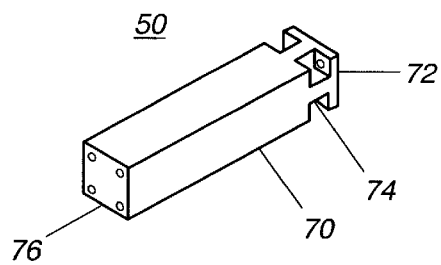
Fig. 5
Fig. 4
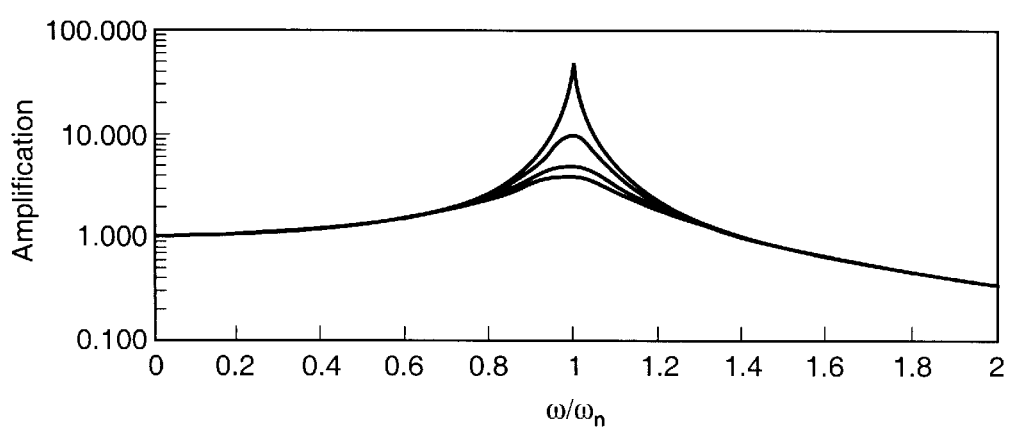
Fig. 6

MECHANICAL AMPLIFIER

GOVERNMENT RIGHTS

This invention was made with Government support under NAS5-32954 awarded by the National Aeronautical and Astronautical Space Administration. The Government has certain rights in this invention.

BACKGROUND OF THE INVENTION

1. Field of the Invention

This invention relates generally to a mechanical amplifier for a vibrational testing device and, more particularly, to a series of mechanical amplifiers used in connection with a shaker, where the amplifiers employ a spring.

2. Discussion of the Related Art

Performance testing of various structures is important to insure that the structures meet load and force requirements for a specific purpose. Therefore, it is known to employ shakers to provide vibrational tests of various structures and components, such as spacecraft and electronic components. One particular shaker used for this purpose is the T4000 shaker system available from Uniholtz-Dickie.

In one known performance test, it is necessary to test the spacecraft structure to 8 g's in an axial configuration. The spacecraft structure, including mass simulators, weighs approximately 5800 pounds. The moving mass of the T4000 shaker system weighs approximately 1700 pounds. Therefore, the ability to accelerate 7500 pounds to 8 g's at 25 Hz is required for a particular vibrational test. This corresponds to approximately 0.25 inches peak-peak displacement and 60,000 pounds of force. However, the T4000 shaker system can only generate 40,000 lbs peak load, and thus is not able to provide the desired input.

Various solutions can be used to meet the necessary testing requirements in this example. These solutions include using a larger shaker system, combining two or more smaller shaker systems, or reverting to static or component level testing. Static or component level testing tends to be labor intensive, and thus is not a desireable alternative. Using a larger shaker system requires that the shaker system be purchased at a very significant cost. Additionally, combining two or more shakers requires suitable fixtures and the like for combining the shakers. The fixtures necessary to combine two or more shakers to meet the testing load capacity would be labor intensive, and also require significant development costs beyond the cost of the actual shaker systems. Also, using larger shaker systems, or combining two more shaker systems increases the space necessary to provide the test.

What is needed is a technique for increasing the vibration capacity of an existing vibrational shaker, without having to incur significant costs. It is therefore an object of the present invention to provide such a shaker system.

SUMMARY OF THE INVENTION

In accordance with the teachings of the present invention, a shaker system is disclosed that employs one or more mechanical amplifiers for increasing the vibrational capacity of the shaker. The mechanical amplifier includes a spring positioned within a support column, where the spring is attached to an interface ring supporting the load to be tested at one end and the ground at an opposite end. The spring can take on different configurations, and in one embodiment is a sinusoidal spring having half-circle sections of a predetermined radius thickness and width which satisfies the resonant frequency requirements for a particular load. The resonant frequency of the spring causes the vibration to be amplified, meeting the testing requirements.

Additional objects, advantages and features of the present invention will become apparent from the following description and appended claims, taken in conjunction with the accompanying drawings.

BRIEF DESCRIPTION OF THE DRAWINGS

FIG. 2 is a perspective view of one of the mechanical amplifiers separated from the shaker system shown in FIG. 1;

FIG. 3 is a perspective view of one of the mechanical amplifiers separated from the shaker system shown in FIG. 1, and exposing the spring within the amplifier column;

FIG. 4 is a side view of the spring removed from the mechanical amplifier shown in FIG. 3;

FIG. 5 is a perspective view of a spacer on which the amplifier spring is mounted within the column shown in FIG. 3; and FIG. 6 is a graph with amplification on the vertical axis and frequency ratio on the horizontal axis showing the amplification curve for various damping values.

DETAILED DESCRIPTION OF THE PREFERRED EMBODIMENTS

Figure 1:
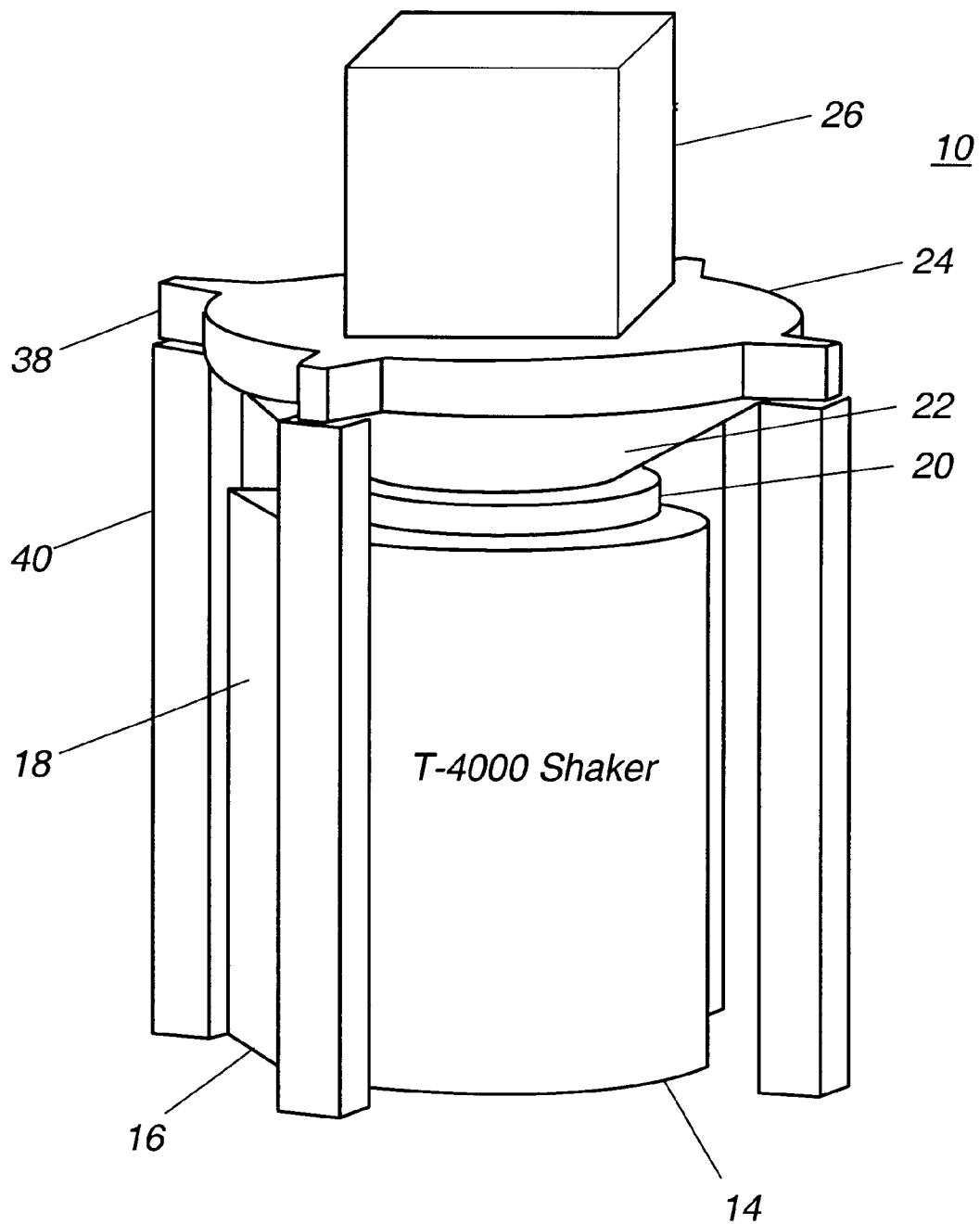
FIG. 1 is a perspective view of a shaker system employing a plurality of mechanical amplifiers, according to an embodiment of the present invention.

The following discussion of the preferred embodiments directed to a mechanical amplifier for a shaker system is merely exemplary in nature, and is in no way intended to limit the invention or its applications or uses.

FIG. 1 is a perspective view of a shaker system 10 that includes a shaker 14 and a support assembly 16 mounted to the shaker 14 and to the floor. Appropriate control circuitry (not shown) causes the shaker 14 to vibrate on an axis 18 in conformance with the predetermined design criteria of the shaker system 10. A head 20 and a head expander 22 are mounted to a top of the shaker 14, and an interface ring 24 is mounted to the head expander 22. A load, here a spacecraft 26, is mounted on the interface ring 24 opposite to the head expander 22. Operation of the shaker 14 causes it to vibrate which excites the spacecraft 26 in a desirable manner for vibrational testing. The shaker system 10, as described so far, is consistent with the known T4000 shaker system.

In accordance with the teachings of the present invention, the shaker system 10 includes a plurality of mechanical amplifiers 40 positioned around the shaker 14 in a symmetrical manner. In this example, there are four amplifiers 40 symetrically positioned around the interface ring 24. However, other numbers of amplifiers 40 can be used in other applications consistent with the discussions herein. Each mechanical amplifier 40 is secured to an extension 38 of the interface ring 24 at one end and to the floor at an opposite end. As will be discussed in detail below, the mechanical amplifiers 40 provide amplification of the vibration generated by the shaker 14, so as to provide increased force for the test.

FIGS. 2 and 3 are perspective views of one of the mechanical amplifiers 40 removed from the shaker system 10. The other amplifiers 40 are the same (within manufacturing tolerances). The mechanical amplifier 40 includes a column 42 connected to a base plate 44 that is mounted to the floor. The column 42 includes four walls 46 attached together to define an elongated square enclosure defining a space 48 therein. A spacer 50 is positioned in the space 48 and is mounted to the base plate 44. A spring 54 is mounted to the spacer 50 and extends out of a top end 56 of the column 42. The column 42 provides a stabilizing force to the spring 54 in the lateral direction. FIG. 4 shows a lengthwise view of the spring 54 and FIG. 5 shows a perspective view of the spacer 50 removed from the amplifier 40.

The spring 54 includes a series of interconnected half-circle spring portions 60 extending between a spacer plate 62 and an end plate 64. The end plate 64 is a block member that includes a friction member 66 secured to each side of the end plate 64. The friction member 66 can be made of any suitable material, such as Deirin, that allows the end plate 64 to easily slide along the inner surface of the walls 46 within the column 42.

The spacer 50 includes an elongated square block portion 70 attached to a support plate 72 by leg members 74. An end 76 of the spacer 50 is secured to the base plate 44 by any suitable securing mechanism, such as bolts or the like. The spacer plate 62 is secured to the support plate 72 by any suitable securing device, such as bolts, so that the combination of the spacer 50 and the spring 54 define an elongated member positioned within the column 42, where a portion of the end plate 64 extends above the end 56 of the column 42. A top surface of the end plate 64 is secured to the extension 38 of the interface ring 24 by any suitable securing device, such as bolts or the like.

Upon operation of the shaker 14, force is applied through the head 20, the head expander 22 and the interface ring 24 to the end plate 64. Downward force on the end plate 64 causes the spring 54 to compress in a spring resilient manner. A return action of the spring 54 applies upward force to the interface ring 24 which increases the energy shaker system 10 if the spring action is at (or near) the right frequency.

The spring 54 is designed to provide amplification for a particular resonant frequency. The length of the spring 54, the number of spring portions 60, the radius of the spring portions 60 and the resiliency or flexibility of the spring 54 are all specially designed for a particular system and frequency. The spring 54 needs to be both stiff and flexible to operate as desired. The spring 54 needs to be stiff so that it is able to support and provide the large forces necessary in the shaking test. The spring 54 needs to be flexible so that it compresses enough to provide the desired amplification. Each spring portion 60 adds up to give the desired stiffness. Each spring portion 60 displaces a certain amount so that the addition of all of the displacements provides the flexibility. The spring 54 is made of a high quality steel, for example, 15-5PH steel. The number of spring portions 60 is selected to provide the desired flexibility. The design of the spring 54 is selected to provide a standing mode resonance at the frequency of the shaker 14. In one embodiment, the inner radius of the spring portions 60 is one inch, the thickness of the spring 54 is one inch and the width of the spring 54 is about five inches.

FIG. 6 is a graph with amplification on the vertical axis and frequency ratio $\omega/\omega_n$ on the horizontal axis for four different damping values ($\zeta$) 0.125, 0.1, 0.05 and 0.01. The amplification of the spring 54 is determined by the damping factor as $1/2\ \zeta$. An amplification factor of two or more can be obtained when $0.8 < \omega/\omega_n < 1.2$ and $\zeta < 0.125$ (12.5% critical damping). Also, there is more margin for error if the resonant frequency is above the target frequency. Using 25 Hz as a target frequency, in one embodiment, the spring 54 was designed with the following properties. $K_{total}$=weight (2 pi freq)$^2$/386.2 approximately≈480,000 lbs/in; total dynamic deflection (peak-peak)=2(gs) (386.1)/(2 pi freq)$^2$ approximately≈0.25 inches; and a minimum life of approximately 1,000 cycles.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A shaker system for shaking a mass, said shaker system comprising:

a shaker operable to provide a shaking motion at a predetermined frequency;

an interface member connected to the shaker and supporting the mass; and at least one spring assembly being rigidly supported and being connected to the interface member, said spring assembly including a spring attached to the interface member, said spring compressing and expanding in response to the shaking motion from the shaker, said spring having a resonant frequency about the same as the predetermined frequency so that the spring amplifies the shaking motion provided by the shaker.

2. A shaker system for shaking a mass, said shaker system comprising:

a shaker operable to provide a shaking motion at a predetermined frequency;

an interface member connected to the shaker and supporting the mass; and at least one spring assembly being rigidly supported and being connected to the interface member, said spring assembly including a spring attached to the interface member and a column enclosure, said spring being mounted in the column enclosure and extending beyond an end of the enclosure to contact the interface member, said enclosure providing lateral support to the spring, said spring compressing and expanding in response to the shaking motion from the shaker, said spring having a resonant frequency about the same as the predetermined frequency so that the spring amplifies the shaking motion provided by the shaker.

3. A shaker system for shaking a mass, said shaker system comprising:

a shaker operable to provide a shaking motion at a predetermined frequency;

an interface member connected to the shaker and supporting the mass; and at least one spring assembly being rigidly supported and being connected to the interface member, said spring assembly including a spring attached to the interface member, a column enclosure, and at least one friction member attached to the end of the spring proximate the interface member and being slidable along an inside surface of the enclosure, said enclosure providing lateral support to the spring, said spring compressing and expanding in response to the shaking motion from the shaker, said spring having a resonant frequency about the same as the predetermined frequency so that the spring amplifies the shaking motion provided by the shaker.

4. The spring assembly according to claim 1 wherein the spring assembly further includes a spacer member, said spacer member being connected to an end of the spring opposite to the interface member and being rigidly supported.

5. The system according to claim 1 wherein the spring is defined by a plurality of half-circle portions forming a sinuous spring.

6. A shaker system for shaking a mass, said shaker system comprising:

a shaker operable to provide a shaking motion at a predetermined frequency;

an interface member connected to the shaker and supporting the mass; and a plurality of spring assemblies symmetrically positioned around the interface member being rigidly supported and connected to the interface member, each spring assembly including a spring attached to the interface member designed to have a resonant frequency, each spring having a resonant frequency about the same as the predetermined frequency, each spring compressing and expanding in response to the shaking motion from the shaker so that the spring amplifies the shaking motion.

7. The system according to claim 1 wherein the spring is designed to have a resonant frequency about the same as the predetermined frequency.

8. A shaker system for shaking a mass, said shaker system comprising:

a shaker operable to provide a shaking motion at a predetermined frequency;

an interface member connected to the shaker and supporting the mass; and a plurality of mechanical amplifiers positioned around the interface member, each mechanical amplifier including a hollow column having side walls and being rigidly supported, a spacer member positioned within the column and being rigidly supported, and a spring positioned within the column and being connected to the spacer member at one end and the interface member at an opposite end, said spring compressing and expanding in response to the shaking motion from the shaker and having a resonant frequency about the same as the predetermined frequency so that the spring amplifies the shaking motion.

9. The system according to claim 8 wherein the spring includes at least one friction member attached to the end of the spring connected to the interface member and being slidable along an inside surface of the column.

10. The system according to claim 8 wherein each spring is defined by a plurality of half-circle portions forming a sinuous spring.

11. The system according to claim 8 wherein the plurality of amplifiers is four amplifiers symetrically positioned around the interface member.

* * * * *